United States Patent [19]
White et al.

[11] Patent Number: 5,001,214
[45] Date of Patent: Mar. 19, 1991

[54] LOW ODOR POLYPHENYLENE ETHER PRODUCED IN THE ABSENCE OF ODOR CAUSING AMINE, IN PRESENCE OF MANGANESE CHELATE COMPLEX CATALYST

[75] Inventors: Dwain M. White, Schenectady; Laura A. Socha, Troy, both of N.Y.

[73] Assignee: General Electric Company, Schenectady, N.Y.

[21] Appl. No.: 370,484

[22] Filed: Jun. 23, 1989

[51] Int. Cl.$^5$ ............................................. C08G 66/45
[52] U.S. Cl. .................................. 528/217; 521/180; 528/212; 528/214; 528/215
[58] Field of Search ................ 528/217, 212, 215, 214

[56] References Cited

U.S. PATENT DOCUMENTS 4,054,553 10/1977 Olander ................................. 260/47

Primary Examiner—Harold D. Anderson
Attorney, Agent, or Firm—William H. Pittman; James C. Davis, Jr.

[57] ABSTRACT

An odor free polyphenylene ether is made from polymerization grade phenolic monomer which has been crystallized from a solvent. An amine free catalyst is used to polymerize the monomer. The polyphenylene ether is useful as a packaging material for food which is to be stored at a low temperature and/or cooked in the package at a high temperature.

15 Claims, No Drawings

LOW ODOR POLYPHENYLENE ETHER PRODUCED IN THE ABSENCE OF ODOR CAUSING AMINE, IN PRESENCE OF MANGANESE CHELATE COMPLEX CATALYST

This invention relates to low-odor polyphenylene ether made from polymerization grade monohydroxyaromatic monomer which monomer has been crystallized from solution This invention also relates to food containers in general including foamed and unfoamed films and cups made from polyphenylene ethers.

The commercial polyphenylene ethers are a well known class of polymers characterized by a unique combination of chemical physical and electrical properties over a temperature range of more than $-350°$ C. extending from a brittle point of about $-170°$ C. to a heat distortion temperature of about 190° C. The broad temperature range of these materials renders them useful for packaging and preserving frozen foods, and cooking packaged frozen foods. The polyphenylene ethers can be fabricated into foamed packages or films which help to preserve the frozen foods, and also provide a receptacle for heating the foods, including heating by microwave. Unfortunately, the prior art polyphenylene ethers have an unpleasant odor, particularly when heated, as in a microwave oven.

The polyphenylene ethers are well known in the art and are disclosed in numerous patents and other publications. The polyphenylene ethers generally comprise a plurality of structural units having the formula

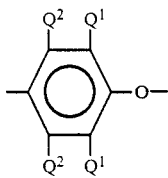

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl and each $Q^2$ is hydrogen. Suitable polyphenylene ethers are disclosed in a large number of patents.

Both homopolymer and copolymer polyphenylene ethers are known. Illustrative homopolymers are those containing 2,6-dimethyl-1,4-phenylene ether units. Illustrative copolymers include random copolymers containing such units in combination with (for example) 2,3,6-trimethyl-1,4-phenylene ether units. Many such random copolymers, as well as homopolymers, are disclosed in the patent literature.

Also known are polyphenylene ethers containing moieties which modify properties such as molecular weight, melt viscosity and/or impact strength. Such polymers are described in the patent literature and may be prepared by grafting onto the polyphenylene ether in known manner such vinylene monomers as acrylonitrile and vinylaromatic compounds (e.g., styrene), or such polymers as polystyrenes and elastomers. The product typically contains both grafted and ungrafted moieties.

Commercial polyphenylene ethers are typically prepared by the oxidative coupling of at least one polymerization grade monohydroxyaromatic monomer. Polymerization grade monohydroxyaromatic monomer is made by vapor phase ortho-alkylation of phenols with an alcohol at a temperature in the neighborhood of 400° C. The product of the vapor phase reaction is distilled and crystallized to produce the polymerization grade monohydroxyaromatic monomer The vapor phase ortho-alkylati is known in the art and is described for example in U.S. Pat. Nos. 3,974,229 and 3,972,836, the disclosures of which are hereby incorporated by reference.

The polymerization grade monohydroxyaromatic monomer is selected from those having the formula

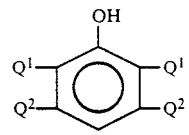

where $Q^1$ and $Q^2$ are as previously described. Particularly useful and readily available polymerization grade monohydroxyaromatic monomers are 2,6-xylenol (wherein each $Q^1$ is methyl and hydrogen), whereupon the polymer may be characterized as a poly(2,6-dimethyl-1,4-phenylene ether), and 2,3,6-trimethylphenol (wherein each $Q^1$ and one $Q^2$ is a methyl and the other $Q^2$ is hydrogen), whereupon the polymer may be characterized as poly(2,3,6-trimethyl-1,4-phenylene ether).

A variety of catalyst systems are known for the preparation of polyphenylene ethers by oxidative coupling For the most part, they contain at least one heavy metal compound such as a copper, manganese or cobalt compound usually in combination with an amine.

A first class of catalyst systems consists of those containing a copper compound Such catalysts are disclosed, for example, in U.S. Pat. Nos. 4,028,341 and 4,092,294. Such catalysts are usually combinations of cuprous or cupric ions, halide (i.e., chloride, bromide or iodide) ions and at least one amine Catalyst systems containing manganese compounds are also known. Such catalysts are disclosed, for example, in U.S. Pat. No. 4,054,553, the disclosure of which patent is incorporated by reference. Such catalysts are generally alkaline systems in which divalent manganese is combined with such anions as halide, alkoxide or phenoxide Most often, the manganese is present as a complex with one or more complexing and/or chelating agents such as dialkylamines, alkanolamines, alkylenediamines, ortho-hydroxyaromatic compounds, ortho-hydroxyazo compounds, omegahydroxyoximes (monomeric and polymeric), ortho-hydroxyaryl oximes and beta-diketones. Also useful for the polymerization of polymerization grade monohydroxyaromatic monomer to polyphenylene ether are cobalt containing catalysts. Manganese and cobalt-containing catalysts for polyphenylene ether preparation are known in the art by reason of disclosure in numerous patents and publications.

One disadvantage of food packages made of polyphenylene ethers is the odor of the polyphenylene ether. The odor problem is further compounded by the heating of food packaged in the polyphenylene ether. U.S Pat. No. 4,384,063 discloses that the addition of a specific antistatic agent will improve such properties as odor in polyphenylene ether resin. U.S. Pat. No. 4,001,341 teaches that fractional crystallization of 2,6-xylenol is economically disadvantageous and does not suggest that fractional crystallization would reduce odor. U.S. Pat. No. 4,568,776 discloses melting surface impurities from 2,6-xylenol crystals. U.S. Pat. No. 3,878,254 discloses recrystallization and separation by chromatography of 6-isobornyl-3,4-xylenol in preparation for its use as a bacteriostatic agent. Again no suggestion of odor removal.

The present invention provides a method for removing odor causing compounds from the polymerization grade monohydric phenol monomer and the use of a catalyst which does not add amine type odors to the polyphenylene ether produced from the monomer. The present invention is easily adaptable to commercial methods for polyphenylene ether production as the method only requires a crystallization of the monohydroxyaromatic monomer from solvent to produce a monomer free of odor bearing impurities and the use of an amine free catalyst to polymerize the monomer to a polyphenylene ether free of odor bearing impurities.

The method for preparing such a monomer comprises dissolving a polymerization grade monohydroxyaromatic monomer contaminated with odor causing impurities in a solvent for the monohydroxyaromatic monomer, cooling the solvent to crystallize the monohydroxyaromatic monomer from the solvent, then separating the crystallized monohydroxyaromatic monomer from the solvent whereby odor causing impurities are removed from the monohydroxyaromatic monomer and remain dissolved in the solvent.

The preferred solvent is a hydrocarbon solvent as the monomer is both easily dissolved in and readily crystallized from a hydrocarbon solvent. The preferred hydrocarbon solvent contains from 5 to 8 carbon atoms, is saturated and/or unsaturated and is a cyclic, branched chain or straight chain hydrocarbon or mixtures thereof. Preferably from three liters to fifteen liters of solvent is used to dissolve each kilogram of monohydric phenolic monomer. The solvent temperature used in the dissolution of the monomer can be any temperature below the boiling point of the solvent and the decomposition point of the monomer. Selection of solvent volume and temperature is within the skill of the art. Also within the skill of the art is the crystallization temperature. Depending upon solvent and solubility, it is desirable that the temperature of crystallization be at least 25° C. above the freezing point of the solvent.

The odor causing impurities which are removed by the crystallization include 2,4,6-trimethylanisole, 7-methyldihydrobenzofuran and homologous species.

The monohydric phenol monomers deodorized by the crystallization method of the present invention have greatly reduced levels of odor causing impurities.

A commercial method of the present invention for preparing a low odor polyphenylene ether starts with the deodorized monohydric phenol monomer as prepared above. The deodorized monomer is then polmerized using an amine free manganese catalyst to produce a low odor polyphenylene ether By amine free is meant that none of the organic amines disclosed by the prior art as separate chemical compounds used to enhance the activity of the manganese catalyst are present. Amine free does not mean that no amine groups are present on an oxime compound complexed with manganese to form the catalyst. It is however preferred that no amine groups be present on the oxime. It is also preferred that no amines be added which could react with the oxime or the manganese in the catalyst.

The manganese catalyst includes those in the form of a manganese chelate complex. The manganese chelate complex is a Type (A) or a mixture of Type (A) and Type (B) manganese chelate complexes selected from Type (A) complexes of the formulas:

$$(L^1)_x Mn, \text{ Type (A)}$$ 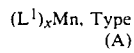

where $L^1$ is a ligand derived from an areneoxime of the general formula

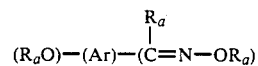

$$(R_aO)-(Ar)-(\underset{|}{\overset{R_a}{C}}=N-OR_a)$$

wherein $R_a$ is independently selected from the group consisting of hydrogen and lower alkyl radicals having from 1–5 carbon atoms, Ar is at least a divalent arene radical having at least one $-OR_4$ radical and at least one

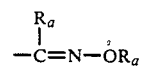

$$\underset{|}{\overset{R_a}{-C}}=N-OR_a$$

radical attached directly to ortho-positioned arene ring carbon atoms, and an oxime of the formula

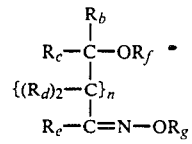

$$R_c-\underset{\underset{R_e-C=N-OR_g}{\overset{|}{\{(R_d)_2-C\}_n}}}{\overset{R_b}{\overset{|}{C}}-OR_f}$$

wherein each $R_b$, $R_c$, $R_d$ and $R_e$ is independently selected from the group consisting of hydrogen, acyclic and cyclic organic radicals and n is a positive integer equal to 0 or 1, Mn is the transition metal manganese, and x is a positive number at least equal to about 0.5. It is preferred that the $R_a$ radicals attached to —O be hydrogen Such catalysts are disclosed in detail in U.S. Pat. No. 3,965,069 which is incorporated by reference into the present disclosure. Compositions wherein $R_a$ is a lower alkyl are either known, or it is within the skill of the art to make the same. Catalysts wherein $R_f$ and $R_g$ are hydrogen are preferred and such catalysts are described in detail in U.S. Pat. No. 3,965,242. Compositions wherein $R_f$ and $R_g$ are lower alkyl are either known or it is within the skill of the art to make the same.

The Type (B) complexes which are combined with the Type (A) complexes are selected from Type (B) complexes of the formula $$(L^2)_x Mn, \text{ Type (B)}$$ 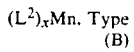

wherein $L^2$ is a ligand other than an $L^1$ ligand, Mn is the transition metal manganese, and x is a positive number at least equal to about 0.5.

The Type (A) complexes which are free of amine are the preferred complexes. The Type (A) complexes are set forth in detail in U.S. Pat. No. 3,952,242, the disclosure of which is hereby incorporated by reference.

The polyphenylene ethers of the present invention are particularly useful in the foamed or unfoamed state as films or packages for wrapping or packaging food which is to be stored cold and then heated in the package, such as by microwave heating Such polyphenylene ethers can also be formed into insulating foamed cups for hot beverages. The polyphenylene ethers of the present invention can also be used in the foamed or unfoamed state as low odor electrical insulation.

For specialized applications, other polyphenylene ethers including copolymers are preferred. Specialized applications include permeable membranes for artificial kidneys and heart-lung machines.

EXAMPLES

A series of polyphenylene ether production runs were made using various catalysts specifically selected from the large body of prior art catalysts to reduce odor in the final polyphenylene ether product. In the production runs, polymerization grade 2,6xylenol made by the magnesium oxide catalyzed ortho alkylation of phenol with methanol vapor at 400° C. was employed. Analyses by gas chromatography/mass spectrometry (Gc/ms) were performed on the initial and purified xylenol. A large decrease (from 92 to 0.07 ppm) in 2,4,6-trimethylanisole (TMA) was found. A correspondingly large decrease (from 134 to 0.6 ppm) in 7-methyldihydrobenzofuran (MDB) was found. A large decrease in other impurities was also found. The types of catalysts and the odors of the polymers after heating to molding temperatures are presented in the Examples below. Nitrogen concentrations in the dried polymer powders are also given in the Examples since the values reflect the level of amine incorporation.

EXAMPLE 1

Polymerization grade 2,6-xylenol was purified by the following procedure. A solution of 450 grams of commercial, polymerization grade 2,6-xylenol in 3 liters of n-hexane was filtered while warm to remove a trace of hazy material and then cooled overnight in a freezer at −10° C. The crystals of 2,6-xylenol that formed were collected on a filter and washed with a small amount of cold hexane and then dried in a vacuum oven at reduce pressure and 25° C. overnight. Analysis by $^1$H nmr showed no hexane in the xylenol The yield was 65%. The initial material and the crystallized material were analyzed by Gc/ms, and the results are as follows:

| SAMPLE | TMA | MDB |
| --- | --- | --- |
| Normal xylenol | 92 ppm | 134 ppm |
| Crystallized xylenol | 0.07 ppm | 0.6 ppm |

The polymerizations with a manganese catalyst, referred to in the following Examples, were conducted as follows. A three liter vessel equipped with a Vibromixer stirrer, an oxygen inlet tube that extends beneath the surface of the reaction mixture, a thermometer and a monomer inlet tube was charged with 45 grams of 2,6-xylenol (crystallized from hexane), 12 grams of a 50% aqueous sodium hydroxide solution, 900 milliliters of toluene and 200 milliliters of methanol Oxygen was introduced at a rate of 1.85 moles per hour and after five minutes a catalyst solution composed of 0.206 grams of manganous chloride, 0.745 grams of benzoin oxime in 25 milliliters of methanol was added. A solution of 255 grams of 2,6 xylenol (crystallized from hexane) in 300 milliliters of toluene was pumped into the reaction vessel at a rate of about 14 milliliters per minute. The reaction temperature was maintained between the original temperature (20° C.) and a maximum of 33° C. during the addition of monomer. Ice was added to a water bath surrounding the reaction vessel when cooling was required to stay within the desired temperature range. After addition was completed (47 minutes), stirring and oxygenation were continued and the temperature was maintained between 25 and 31° C. After a total reaction time of 154 minutes, acetic acid was added to terminate the reaction. The polymer was isolated by adding methanol to the reaction mixture, collecting the precipitated polymer on a filter, washing it with methanol, reprecipitating it from toluene solution by adding methanol, washing with methanol and drying in a vacuum oven at 80° C. The yield was 275 grams. The product was pressed into a film. The film had no odor, a nitrogen content of 78 ppm, and an intrinsic viscosity of 0.41 deciliters per gram.

EXAMPLES 3, 4 and 5

The other polymerizations in the following Examples, which used manganese catalysts, were carried out in a similar manner to the method presented above except that in some cases normal polymerization grade 2,6-xylenol was used instead of the solvent crystallized material and in some cases 3.00 grams of di-n-butylamine (DBA) was added immediately before the catalyst was added. Reaction times differed when the di-n-butylamine was present. Samples were removed periodically during the polymerization to determine the desired reaction time.

EXAMPLE 3 RESULTS

A film pressed from a polyphenylene ether made as above except that polymerization grade monomer was used, had a week odor, a nitrogen content of 127 ppm and an intrinsic viscosity of 0.58.

EXAMPLE 4 RESULTS

A film pressed from a polyphenylene ether made as the polyphenylene ether of Example 3 above except that DBA was added, had a strong odor, a nitrogen content of 756 and an intrinsic viscosity of 0.47.

EXAMPLE 5 RESULTS

A film pressed from a polyphenylene ether made as in Example 4 above except that solvent crystallized monomer was used, had a strong odor, a nitrogen content of 709 ppm and an intrinsic viscosity of 0.38.

EXAMPLE 6

The polymerizations with a copper catalyst referred to in the following Examples were conducted as follows. A copper catalyst solution was prepared by dissolving 1.18 grams of cuprous oxide in sufficient 48% hydrobromic acid to form 10 milliliters of solution. The reaction vessel described above was charged with 30 grams of 2,6-xylenol (polymerization grade), 750 milliliters of toluene, 1.656 milliliters of the copper catalyst solution, 14.76 milliliters of N,N-dimethylbutyl amine (DMBA), 942 milligrams of N,N'-di-(tertiary-butyl)-1,2-ethylene diamine (DBEDA), 3.9 milliliters of di-n-butylamine and 3.0 milliliters of a 10% solution of Adogen 464 methyltricaprylammonium chloride. Oxygen was introduced at a rate of 4.9 moles per hour. A solution of 270 grams of 2,6-xylenol (polymerization grade) was pumped in at a rate of 50 milliliters per minute. The addition time was 23 minutes The reaction temperature was allowed to rise from 20° to 40° C., then maintained at 40° C. until the end of the reaction. The total reaction time was 81 minutes. The reaction was terminated by adding acetic acid and the polymer was isolated by the method described in the procedure using the manganese catalyst. The yield was 260 grams. Film pressed from the product had a strong odor, a nitrogen content of 640 ppm and an intrinsic viscosity of 0.58.

EXAMPLES 7-9

The other Examples which used copper catalyst were carried out in a similar manner except that in some cases the di-n-butylamine was omitted and the 2,6-xylenol had been purified by crystallization from hexane.

EXAMPLE 7 RESULTS

The polyphenylene ether of Example 7 was made the same way as that of Example 6 except that purified monomer was used. Film pressed from the product had a strong odor, a nitrogen content of 557 pm and an intrinsic viscosity of 0.54.

EXAMPLE 8 RESULTS

The polyphenylene ether of Example 8 was made in the same way as that of Example 6 except that no di-n-butylamine was used to enhance the catalytic activity Film pressed from the product had a strong odor, a nitrogen content of 312 ppm and an intrinsic viscosity of 0.52.

EXAMPLE 9 RESULTS

The polyphenylene ether of Example 9 was made in the same way as that of Example 8 except that the monomer was purified by crystallization from solvent Film pressed from the product had a strong odor, a nitrogen content of 353 ppm and an intrinsic viscosity of 0.52.

The polymers made with the manganese catalyst and DBA had odors that were as strong as those from the polymers from the copper catalysts In the absence of DBA, however, the odor was significantly less. With the purified xylenol none of the characteristic polyphenylene ether odor was noted.

The Examples shown above are given to teach the combined effect of monomer purification and amine-free catalyst on the preparation of low odor polyphenylene ethers and are not intended to restrict the scope of the invention. Solvents other than n-hexane, e.g., isomeric hexanes, cyclohexane, n-pentane, isomeric pentanes and mixtures of hydrocarbons can be used to purify the xylenol. Other amine-free catalysts can be used to prepare the polymer. The approach taught by the Examples can also be used to make other polyphenylene ethers which are based upon other phenols, particularly other 2,6-disubstituted phenols.

What is claimed is:

1. A method for preparing a low odor polyphenylene ether, the method comprising the steps of:
   (a) dissolving a polymerization grade phenolic monomer, made by the vapor phase ortho-alkylation of a phenol by an alcohol, in a solvent for the phenolic monomer,
   (b) cooling the solvent to crystallize the phenolic monomer from the solvent,
   (c) then separating the crystallized phenolic monomer from the solvent, whereby odor causing impurities are removed from the phenolic monomer and remain dissolved in the solvent,
   (d) contacting the phenolic monomer with oxygen, in the absence of an odor causing amine and in the presence of a manganese chelate complex catalyst for the polymerization of the phenolic monomer to a low odor polyphenylene ether.

2. A method according to claim 1 wherein the manganese chelate complexes is a Type (A) or a mixture selected from Type (A) complexes of the formulas:

$$(L^1)_x Mn \text{ Type (A)}$$

and from Type (B) complexes of the formula $$(L^2)_x Mn \text{ Type (B)}$$

Where $L^2$ is a ligand other than an $L^1$ ligand and $L^1$ is a ligand derived from an areneoxime of the general formula

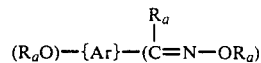

wherein each $R_a$ is independently selected from the group consisting of hydrogen and lower alkyl radicals having from 1-5 carbon atoms Ar is at least a divalent arene radical having at least one $R_aO$-radical and at least one

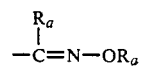

radical attached directly to ortho-positioned arene ring carbon atoms, and an oxime of the formula

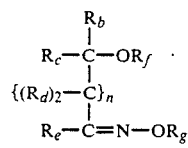

wherein each $R_b$, $R_c$, $R_d$ and $R_e$ is independently selected from the group consisting of hydrogen, acyclic and cyclic organic radicals and n is a positive integer equal to 0 or 1, each $R_f$ and $R_g$ is independently selected from the group consisting of hydrogen and lower alkyl, Mn is the transition metal manganese, and x is a positive number at least equal to about 0.5.

3. A method according to claim 1 wherein $L^1$ is a ligand derived from an areneoxime of the formula

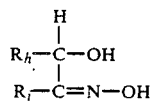

wherein and $R_h$ and $R_i$ are each independently selected from the class consisting of phenyl and lower alkyl substituted phenyl groups.

4. A method according to claim 3 where x is 2.

5. A method according to claim 1 comprising the steps of:
   (a) dissolving a polymerization grade 2,6-xylenol in n-hexane.
   (b) cooling the n-hexane to crystallize the 2,6-xylenol from the n-hexane,
   (c) then separating the crystallized 2,6-xylenol from the n-hexane, whereby odor causing impurities are removed from the 2,6-xylenol and remain dissolved in the n-hexane,
   (d) contacting the 2,6-xylenol with oxygen, in the absence of an odor causing amine and in the presence of a manganese chelate complex catalyst for the polymerization of the 2,6-xylenol to a low odor polyphenylene ether.

6. A method according to claim 1 wherein the solvent is a hydrocarbon solvent.

7. A method according to claim 6 wherein the solvent contains from 5 to 8 carbon atoms and is a cyclic, branched chain or straight chain hydrocarbon or mixture thereof.

8. A method according to claim 1 wherein a ratio of from three liters to fifteen liters of solvent is used to dissolve one kilogram of phenolic monomer.

9. A method according to claim 1 wherein the odor causing impurities are selected from the group consisting of 2,4,6-trimethylanisole, 7-methyldihydrobenzofuran and homologous species.

10. A polyphenylene ether produced by the process of claim 1.

11. A polyphenylene ether produced by the process of claim 2.

12. A polyphenylene ether produced by the process of claim 3.

13. A food package made from the polyphenylene ether of claim 10.

14. A food wrapping film made from the polyphenylene ether of claim 10.

15. A method according to claim 1 wherein the polyphenylene ether comprises a plurality of structural units having the formula

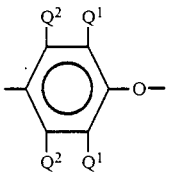

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary o secondary lower alkyl, phenyl, haloalkyl, hydrocarbonoxy or halohydrocarbonoxy as defined for $Q^1$.

* * * * *